(12) United States Patent
Tanizawa et al.

(10) Patent No.: US 7,443,983 B2
(45) Date of Patent: Oct. 28, 2008

(54) COMMUNICATION APPARATUS AND METHOD

(75) Inventors: Yoshimichi Tanizawa, Kawasaki (JP); Masataka Goto, Yokohama (JP); Yoshihiko Kashio, Kawasaki (JP); Masahiro Takagi, Tokyo (JP); Naohisa Shibuya, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 525 days.

(21) Appl. No.: 10/973,472

(22) Filed: Oct. 27, 2004

(65) Prior Publication Data

US 2005/0135625 A1    Jun. 23, 2005

(30) Foreign Application Priority Data

Dec. 19, 2003    (JP)    ............................. 2003-422395

(51) Int. Cl.
  *H04K 1/00*    (2006.01)
(52) U.S. Cl. ........................... 380/270; 380/277; 726/3; 726/14; 455/410; 455/411
(58) Field of Classification Search ................. 380/270, 380/277; 455/410–411; 370/392, 338; 726/14, 726/3
See application file for complete search history.

(56) References Cited

U.S. PATENT DOCUMENTS

2005/0135625 A1    6/2005    Tanizawa et al.

FOREIGN PATENT DOCUMENTS

| JP | 9-130397 | 5/1997 |
|---|---|---|
| JP | 2001-177514 | 6/2001 |
| JP | 2002-232597 | 8/2002 |
| JP | 2002-288394 | 10/2002 |
| JP | 2003-501891 | 1/2003 |
| JP | 2003-229848 | 8/2003 |

OTHER PUBLICATIONS

U.S. Appl. No. 11/236,808, filed Sep. 28, 2005, Goto et al.

*Primary Examiner*—Thanhnga B Truong
(74) *Attorney, Agent, or Firm*—Oblon, Spivak, McClelland, Maier & Neustadt, P.C.

(57) ABSTRACT

A communication apparatus which is connected to networks including first network of first security level which is lowest security level and second network of second security level, and is wirelessly connected to terminal receiving terminal identifier and password which designates one of networks, from terminal, selecting one of first security level and second security level based on an authentication result of terminal, terminal identifier, and password, forwarding, when second security level is selected, data item which is transmitted from terminal and is encrypted using cryptographic algorithm and cryptographic key to second network, and forwarding, to terminal, data item which is transmitted from second network and addressed to terminal, and forwarding, when first security level is selected, data item transmitted from terminal to first network, and forwarding, to terminal, data item which is transmitted from first network and addressed to terminal.

14 Claims, 12 Drawing Sheets

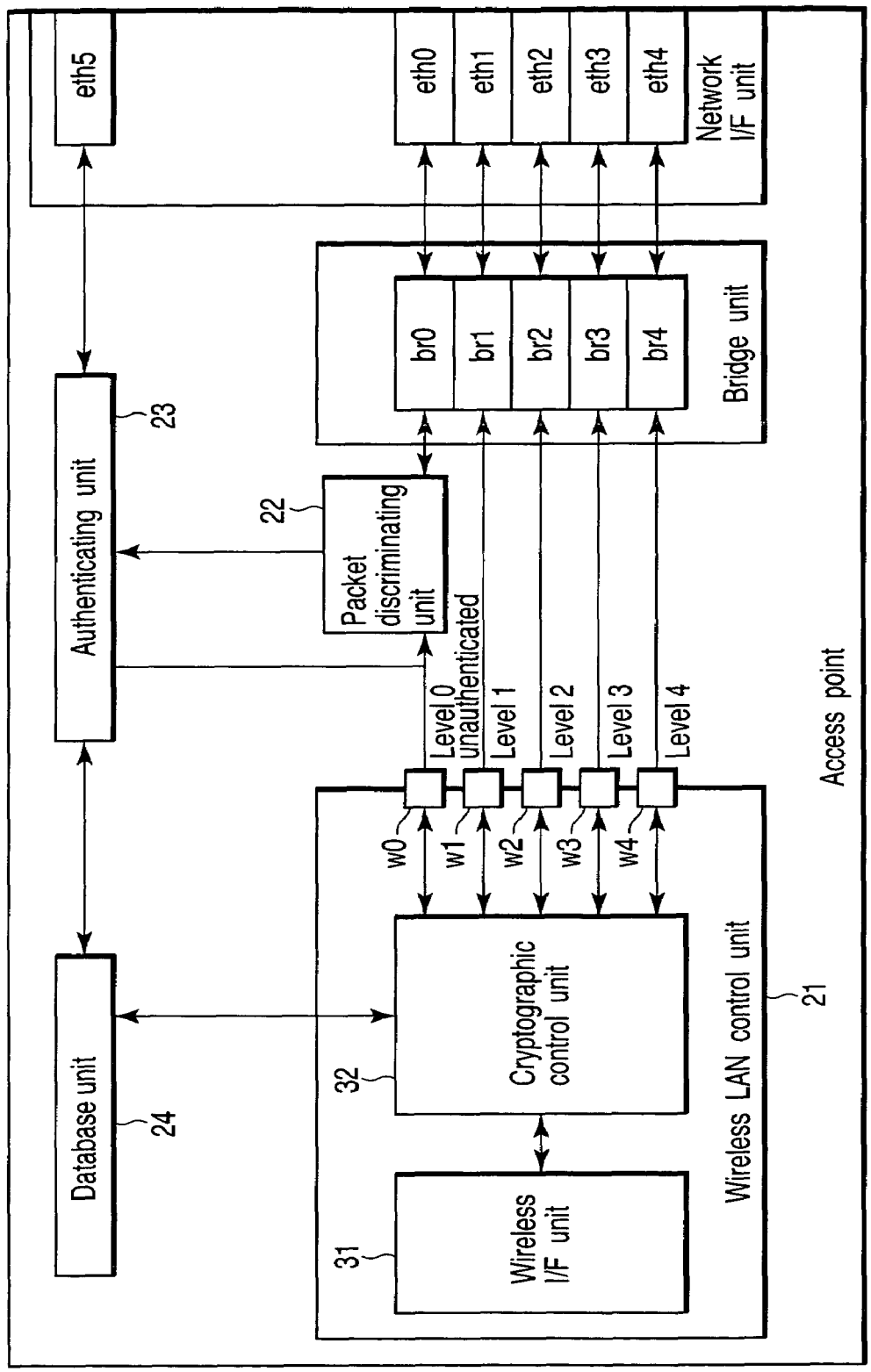
F I G. 4

Authentication server

| Client identifier (MAC address) | Password | Level |
|---|---|---|
| A | A001 | Level 0 |
| A | A002 | Level 1 |
| A | A003 | Level 2 |
| A | A004 | Level 3 |
| A | A005 | Level 4 |
| B | B001 | Level 0 |
| B | B002 | Level 1 |
| C | C001 | Level 0 |

F I G. 5

Database

| Client identifier (MAC address) | Key ID | Level | Cryptographic key | Cryptographic method |
|---|---|---|---|---|
| A | KID1 | Level 2 | Ked1 | Method B |

F I G. 6

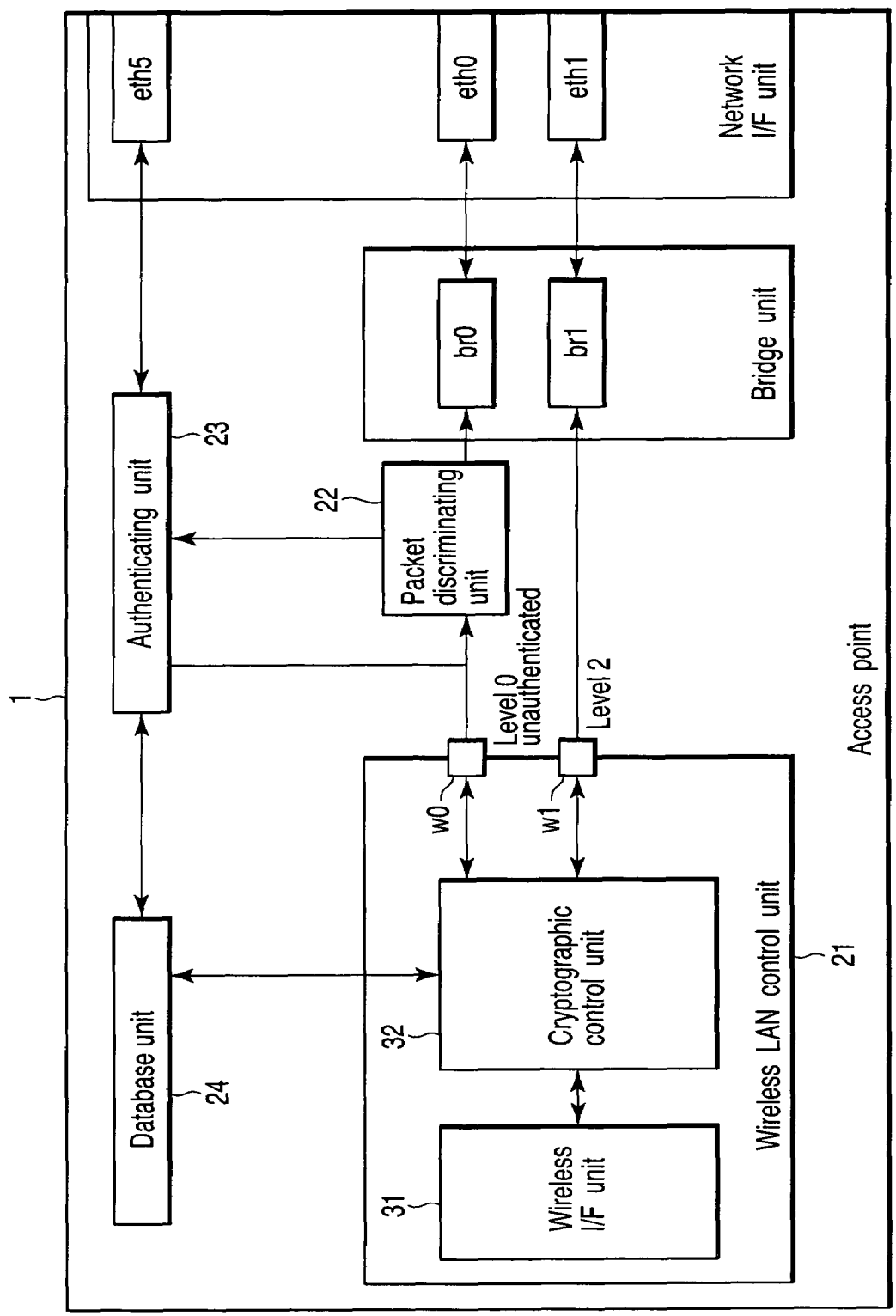
F I G. 14

COMMUNICATION APPARATUS AND METHOD

CROSS-REFERENCE TO RELATED APPLICATIONS

This application is based upon and claims the benefit of priority from prior Japanese Patent Application No. 2003-422395, filed Dec. 19, 2003, the entire contents of which are incorporated herein by reference.

BACKGROUND OF THE INVENTION

1. Field of the Invention

The present invention relates to a wireless LAN system.

2. Description of the Related Art

Wireless LANs remarkably improve the possibility and flexibility of network systems, but security measures are indispensable owing to wireless communication. Limitation of clients who access a wireless LAN requires a mechanism of authenticating a client at an access point when the client requests connection to the access point.

Under this situation, a system of separately preparing an authentication server serving as a server for authenticating a client, and performing authentication between a client, an access point, and the authentication server is standardized as IEEE 802.1x by IEEE. This system is widely used.

At present, many attempts are made to install a wireless LAN system in public environments such as a hot spot. In the hot-spot environment, many unspecified clients exist, and authentication for determining whether a client should be provided with hot spot services is very important.

Whether to permit or inhibit network access is decided on the basis of the authentication results of many unspecified clients. Demands may also arise for assigning clients a plurality of levels and providing different services to the clients. For example, services to be provided to an unregistered client, registered client, and charged client are switched.

In addition to access to services corresponding to the level of a client, access to services provided to lower levels can also be permitted such that a charged client receives services for a registered client and services for an unregistered client.

For example, a technique of limiting access from a cell phone to each electronic device in accordance with the authentication level of the user has been proposed (see, e.g., Jpn. Pat. Appln. KOKAI Publication No. 2002-232597).

A technique of limiting an access right to schedule information in accordance with the authentication level in a schedule management system is also available (see, e.g., Jpn. Pat. Appln. KOKAI Publication No. 2002-288394).

The access point of a conventional wireless LAN system is connected to a single network, and only an authenticated client can communicate via the access point and the network.

At the access point of the conventional wireless LAN system, each wirelessly connected client cannot communicate via a network corresponding to the client out of a plurality of networks which provide different security levels and along with this, different services and the like. For example, the access point is connected to a single network. Thus, it is difficult to provide a service of connecting a client who has successfully been authenticated and a client who fails in authentication to different networks. Also, it is difficult to authenticate a client and provide a different service in accordance with the authentication result.

BRIEF SUMMARY OF THE INVENTION

According to embodiments of the present invention, there is provided a communication apparatus that allows a client to easily, flexibly access one of a plurality of networks while maintaining security levels assigned in advance to these networks and the client.

The communication apparatus which is wirelessly connected to a first terminal and is connected to a plurality of networks corresponding to different security levels and including a first network of a first security level which is a lowest security level of the security levels and a second network of a second security level of the security levels: storing a first cryptographic algorithm corresponding to the second security level, and an identifier of the first cryptographic algorithm, in a memory device; receiving from the first terminal a first terminal identifier and a first password corresponding to one of the networks; authenticating the first terminal; selecting one of the first security level and the second security level based on an authentication result of the first terminal, the first terminal identifier, and the first password; generating, when the second security level is selected, a cryptographic key used in the first cryptographic algorithm; transmitting, when the second security level is selected, the cryptographic key and the identifier of the first cryptographic algorithm to the first terminal; transferring, when the second security level is selected, a first data item to the second network and a second data item to the first terminal, the first data item obtained by being encrypted by the first terminal using the first cryptographic algorithm and the cryptographic key, and received from the first terminal, and the second data item addressed to the first terminal and received from the second network; and transferring, when the first security level is selected, a third data item to the first network and a fourth data item to the first terminal, the third data item received from the first terminal, and the fourth data item addressed to the first terminal and received from the first network.

BRIEF DESCRIPTION OF THE SEVERAL VIEWS OF THE DRAWING

FIG. 4 is a block diagram showing an example of the configuration of the access point in FIG. 3;

FIG. 5 is a table showing an example of a table stored in an authentication server;

FIG. 6 is a table showing an example of a table stored in the database unit of the access point;

FIG. 14 is a block diagram showing another example of the configuration of the access point.

DETAILED DESCRIPTION OF THE INVENTION

Before a description of a wireless LAN system according to an embodiment of the present invention, a conventional wireless LAN system will be briefly explained. In this case, IEEE 802.1x will be exemplified.

Figure 1:
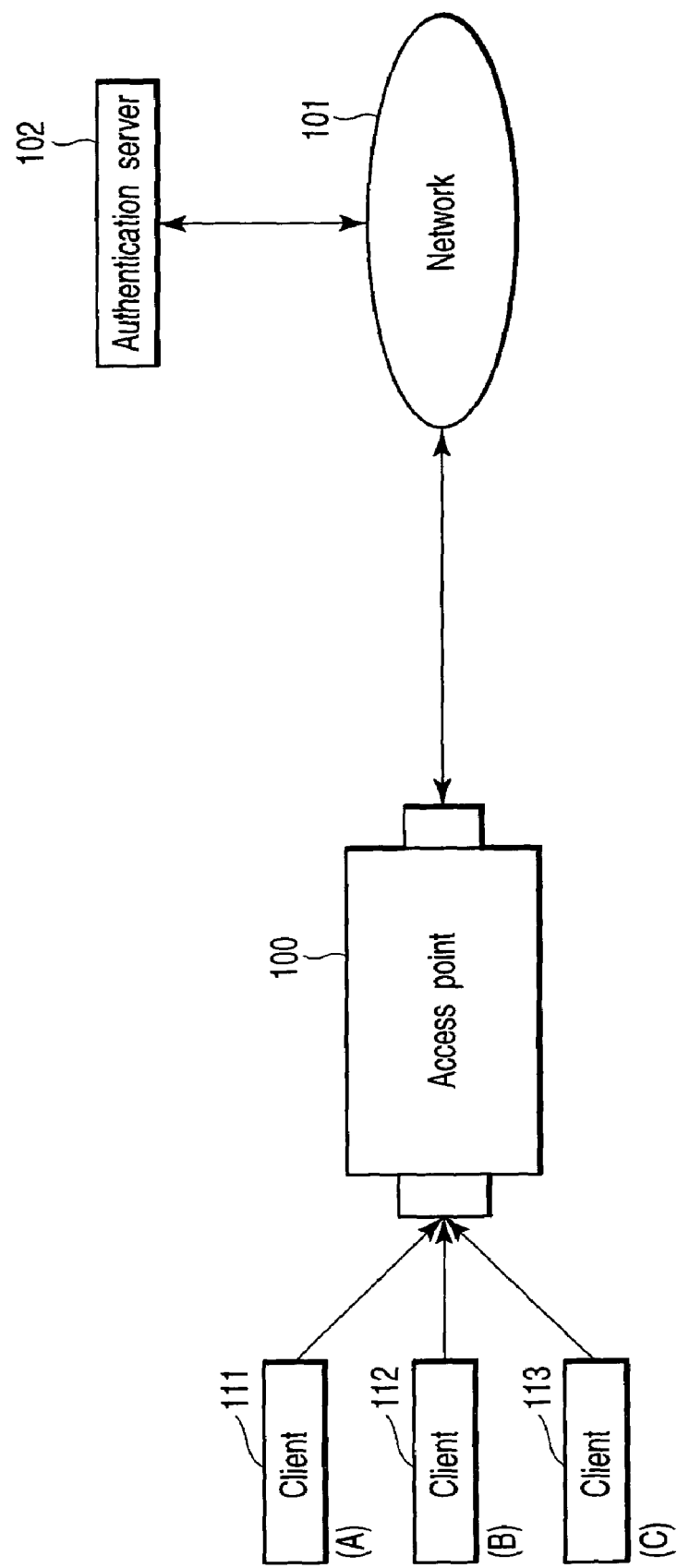
FIG. 1 is a block diagram showing the overall configuration of a wireless LAN system including an access point connected to one network.

FIG. 1 shows an example of the configuration of a conventional wireless LAN system. An access point 100 connects a plurality of (in this case, three) client terminals 111 to 113 to, e.g., a wire network 101. An authentication server 102 authenticates a client who is permitted to access the network 101 via the access point 100. The client terminals 111 to 113 have a wireless communication function, and access the network 101 via the access point 100.

Figure 2:
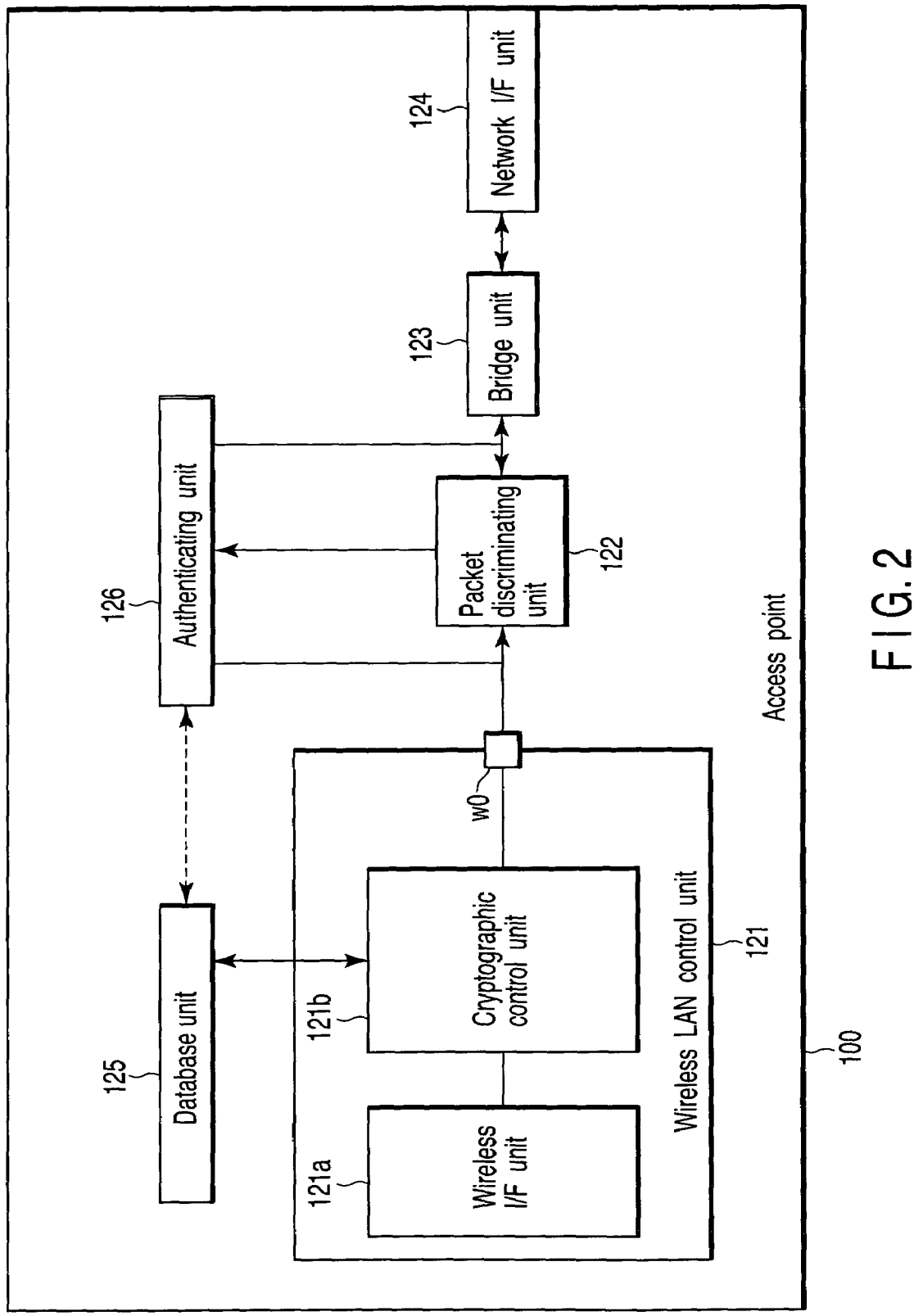
FIG. 2 is a block diagram showing an example of the configuration of the access point in FIG. 1.

FIG. 2 shows an example of the configuration of the access point 100. The access point 100 is roughly comprised of a wireless LAN control unit 121, packet discriminating unit 122, authenticating unit 126, database unit 125, bridge unit 123, and network interface unit (network I/F unit) 124.

The wireless LAN control unit 121 exchanges packets in a wireless communication section between the access point 100 and a client terminal. The packet discriminating unit 122 determines whether a packet received by the wireless LAN control unit 121 is a client authentication packet. The authenticating unit 126 authenticates a client. The database unit 125 holds the identifier (e.g., MAC address) of a client terminal authenticated by the access point and a cryptographic key used in communication between the access point and the client terminal in correspondence with each other. The bridge unit 123 transfers a packet between the wireless LAN control unit 121 and the network I/F unit 124. The network I/F unit 124 exchanges packets with the network 101.

The wireless LAN control unit 121 includes a wireless interface unit (wireless I/F unit) 121a, cryptographic control unit 121b, and internal port w0. The wireless I/F unit 121a establishes a wireless communication channel between the access point 100 and a client terminal, and exchanges packets via the wireless communication channel. The cryptographic control unit 121b decrypts an encrypted packet received from a client terminal, and encrypts a packet to be transmitted to a client terminal. The internal port w0 outputs a packet from the wireless LAN control unit 121. The network I/F unit 124 is an interface for connecting the access point 100 to the network 101. The bridge unit 123 transfers to the network I/F unit 124 a packet which is output from the internal port w0 of the wireless LAN control unit 121 and passes through the packet discriminating unit 122.

In this configuration, a wireless communication channel is established between a client terminal and the access point 100. Various data are exchanged between the client terminal, the access point 100, and the authentication server 102. After the end of authentication, the client terminal and access point 100 generate the same cryptographic key on the basis of pieces of information and the like exchanged in the authentication process. Packets to be exchanged in the wireless section between the client terminal and the access point 100 are encrypted using the cryptographic key.

A packet received by the wireless I/F unit 121a is transferred to the cryptographic control unit 121b. When the packet has been encrypted, the cryptographic control unit 121b decrypts it. In decryption, the cryptographic control unit 121b inquires, of the database unit 125, information on a cryptographic key used by client terminal that the packet transmits. The cryptographic control unit 121b transfers the packet from the internal port w0 to the packet discriminating unit 122. The packet discriminating unit 122 determines whether the packet transferred from the internal port w0 is an authentication packet. If the packet is determined to be an authentication packet, the packet discriminating unit 122 transfers it to the authenticating unit 126. If the packet is determined not to be an authentication packet, the packet discriminating unit 122 transfers it to the bridge unit 123.

Upon reception of the client authentication packet from the packet discriminating unit 122, the authenticating unit 126 generates a packet addressed to the authentication server 102, and outputs the packet to the bridge unit 123 so as to transmit it to the authentication server 102. The authenticating unit 126 outputs to the internal port w0 an authentication packet which is received from the authentication server 102 via the network I/F unit 124 and bridge unit 123 and addressed to the client. After the end of authentication, the authenticating unit 126 registers a cryptographic key used by the target client in the database unit 125.

The bridge unit 123 associates the internal port w0 with the network I/F unit 124. More specifically, the bridge unit 123 transfers to the network I/F unit 124 a packet input from the internal port w0 via the packet discriminating unit 122, and a packet transferred from the authenticating unit 126. Also, the bridge unit 123 transfers a packet input from the network I/F unit 124 to the authenticating unit 126 and internal port w0 via the packet discriminating unit 122.

As described above, the conventional access point 100 is connected to one network 101, and comprises only one network I/F unit 124 for connecting the network 101. The wireless LAN control unit 121 comprises only one internal port w0 for outputting a packet from a client terminal to the network 101 and inputting to the wireless LAN control unit 121 a packet which is received from the network 101 and addressed to a client terminal. The access point 100 comprises only one bridge unit 123 for associating the internal port w0 with the network I/F unit 124.

A wireless LAN system according to the embodiment of the present invention will be explained.

Figure 3:
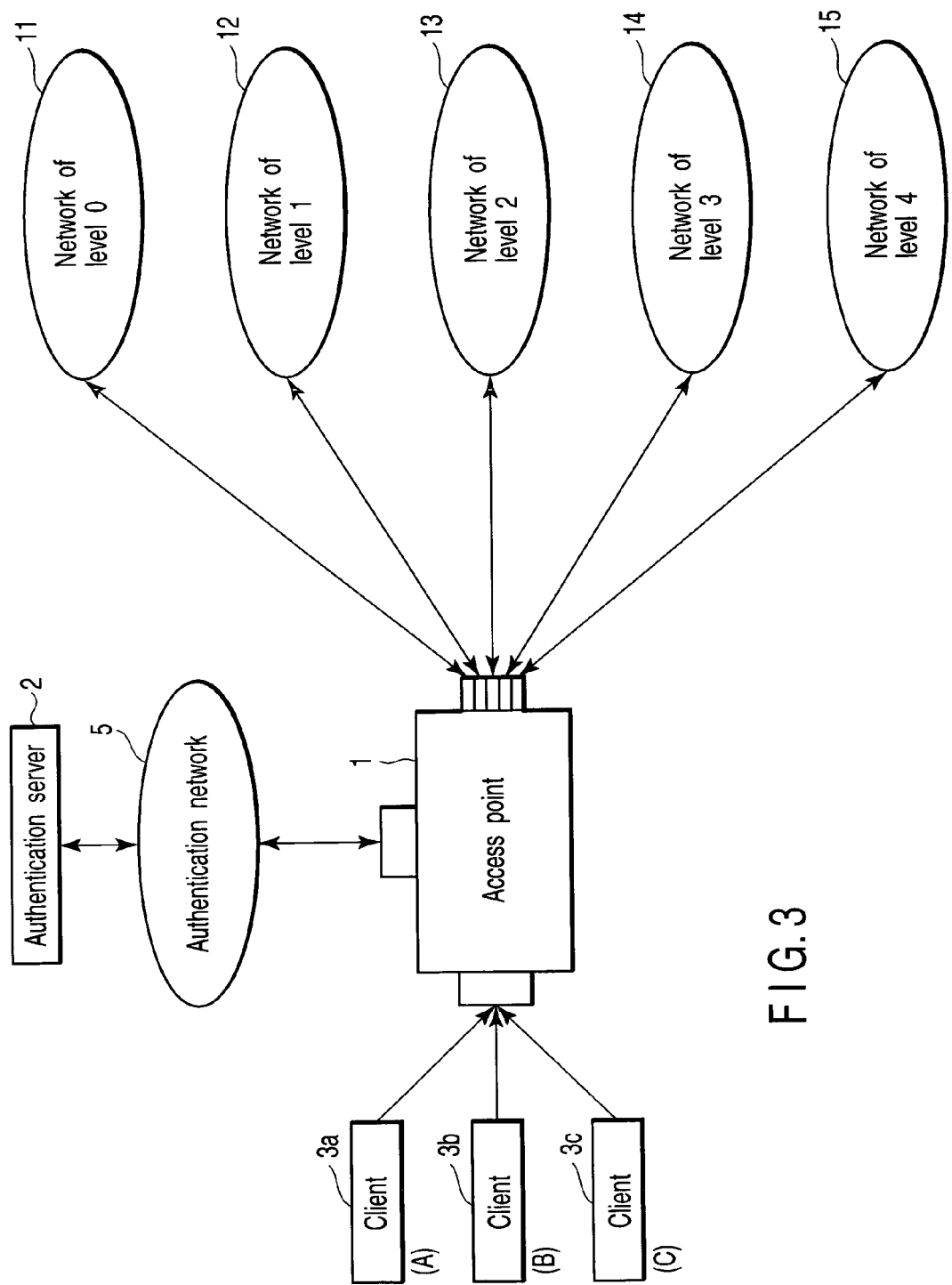
FIG. 3 is a block diagram showing the overall configuration of a wireless LAN system according to an embodiment of the present invention.

FIG. 3 shows an example of the configuration of a wireless LAN system according to the embodiment. The wireless LAN system includes an access point 1, a plurality of (in this case, three) client terminals 3a to 3c which are wirelessly connected to the access point 1, and an authentication server 2 which is connected to the access point 1 via an authentication network 5 and performs authentication procedures with (the user of) each client terminal wirelessly connected to the access point 1. The access point 1 is connected to a plurality of (e.g., five) networks 11 to 15 of different types. The networks 11 to 15 are, e.g., wire networks.

The networks 11 to 15 provide different service contents and the like to a client, and therefore have different security levels. Because of this difference, the communication speed, communication protocol, physical layer network, and the like may be different between the networks 11 to 15. The type difference between the networks 11 to 15 is discriminated by the security level. The networks 11 to 15 correspond to security levels "level 0" to "level 4". A larger value means a higher security level. The network 11 of level 0 can be accessed even by a client terminal which fails in authentication as far as the client terminal is wirelessly connected to the access point 1. As the level value increases, client terminals capable of accessing the network are limited. Client terminals capable of accessing one of the network 12 of level 1 to the network 15 of level 4 can also access a network whose level is lower than the level of the accessible network. For example, a client terminal which can access the network 12 of level 1 can also access the network 11 of level 0. A client terminal which can access the network 15 of the highest level "level 4" can access the networks 11 to 15 of all the levels.

A plurality of client terminals are assigned the levels of accessible networks out of a plurality of networks with difference levels in accordance with designation by the user of the client terminal, the affiliation of the user, the paid amount, and the like.

For example, a client terminal assigned "level 2" can access the networks 11 to 13 of levels 0 to 2.

As shown in FIG. 5, the authentication server 2 stores, for each client terminal, the level of a network accessible by the client terminal. That is, as shown in FIG. 5, the level of a network accessible by each client terminal, and access information, e.g., a password necessary to access the network are stored together with the identifier of the client terminal (e.g., the MAC address of the client terminal).

When, for example, a level value assigned to a client in advance is large, the client can also access a lower-level network. Thus, some client terminals can access networks of a plurality of levels. The table of FIG. 5 stores a plurality of passwords corresponding to networks of a plurality of levels for a client terminal capable of accessing the networks of the plurality of levels. The client terminal uses a password corresponding to a desired network out of the plurality of passwords, and can receive services from the desired network out of the networks of the plurality of levels accessible by the client terminal.

Referring back to FIG. 3, the access point 1 is a communication apparatus for connecting a client terminal wirelessly connected to the access point 1, to a network of a level accessible by the client terminal out of the networks 11 to 15.

The authentication server 2 authenticates a client terminal which is permitted to access a network via the access point 1. As shown in FIG. 1, in response to an inquiry from the access point 100, the conventional authentication server 102 only sends back information of whether a client terminal is authenticated.

To the contrary, the authentication server 2 according to the embodiment shown in FIG. 3 exchanges pieces of information necessary for authentication between the authentication server 2 and a client terminal to be authenticated (via the access point 1). The authentication server 2 performs an authentication process for the client terminal to be authenticated, and selects the level of a network to which the client terminal is connected, by looking up an authentication result, a client identifier (MAC address) received from the client terminal, a password, and the table shown in FIG. 5. The authentication server 2 notifies an authenticating unit 23 of the access point 1 via the authentication network 5 of the level together with the authentication result (failure or success).

The client terminals 3a to 3c have a wireless communication function, and exchange packets with communication partners on, of the networks 11 to 15, networks accessible by the client terminals via the access point 1. The client terminals 3a to 3c will be commonly called a client terminal 3 as far as they need not be discriminated.

When the client terminal 3 is successfully authenticated by the authentication server 2 and can access a plurality of networks, the client terminal 3 can access a network of a level designated by a password used in authentication with the authentication server 2. Even when the client identifier (MAC address), password, or level of the client terminal 3 are not registered in the authentication server 2 or authentication of the client terminal 3 fails, the client terminal 3 can communicate with the network 11 of level 0.

The authentication server 2 selects either level 0 or a level corresponding to the password on the basis of a client identifier and password sent from the client terminal 3, the level of an accessible network that is registered in the table shown in FIG. 5 and assigned in advance to the client, and the authentication result of the client terminal 3.

When authentication is successful and a level corresponding to a password transmitted from the client is registered in the table of FIG. 5, the authentication server 2 sends back to the access point 1 an authentication result (success) and a level corresponding to the password transmitted from the client terminal 3. When authentication fails or no client identifier and password are registered in the table of FIG. 5, the authentication server 2 sends back an authentication result (failure) and level 0 to the access point 1.

The access point 1 (authenticating unit 23 to be described later) selects a cryptographic method which is used to encrypt data to be exchanged between the access point 1 and the client terminal 3 and corresponds to a level (level 1 to level 4) notified by the authentication server 2. Further, at the access point 1, a cryptographic key corresponding to the selected cryptographic method is generated. The selected cryptographic method and generated cryptographic key are sent to the client 3.

FIG. 4 shows an example of the configuration of the access point 1. The access point 1 is roughly includes a wireless LAN control unit 21, a packet discriminating unit 22, the authenticating unit 23, a database unit 24, bridge units br0 to br4, and network interface units (network I/F units) eth0 to eth5.

As described above, the access point 1 is connected to the authentication network 5 connected to the authentication server 2, and the networks 11 to 15 respectively corresponding to levels 0 to 4. The network I/F units eth0 to eth5 respectively connect the networks 11 to 15 and the authentication network 5, and exchange packets with these networks.

The authentication network 5 is set to level 5 higher than level 4, and is a network of the highest security level. The authentication network 5 is connected to the network I/F unit eth5, and the access point 1 accesses the authentication server 2 via the network I/F unit eth5. The client terminal 3 does not access the authentication network 5. Access from the client terminal 3 to the authentication network 5 is set to be impossible in advance.

The wireless LAN control unit 21 exchanges packets in a wireless section between the access point 1 and a client terminal. The wireless LAN control unit 21 has five internal ports w0 to w4 corresponding to the five levels of the network 5 and networks 11 to 15.

The packet discriminating unit 22 determines whether a packet output from the internal port w0 of the wireless LAN control unit 21 (a packet that is transmitted from the unauthenticated client terminal 3 (having no authentication result)) is an authentication packet containing information necessary to authenticate the client terminal 3.

In order to authenticate the client terminal 3, the authenticating unit 23 exchanges authentication packets with the client terminal 3, and also exchanges authentication packets with the authentication server 2. Based on an authentication result and level notified by the authentication server 2 as a result of authentication, the authenticating unit 23 selects a cryptographic method which is used to encrypt data to be exchanged between the access point 1 and the client terminal 3 and corresponds to the level notified by the authentication server 2. The authenticating unit 23 stores, e.g., a table as shown in FIG. 8.

Figures 7, 8:
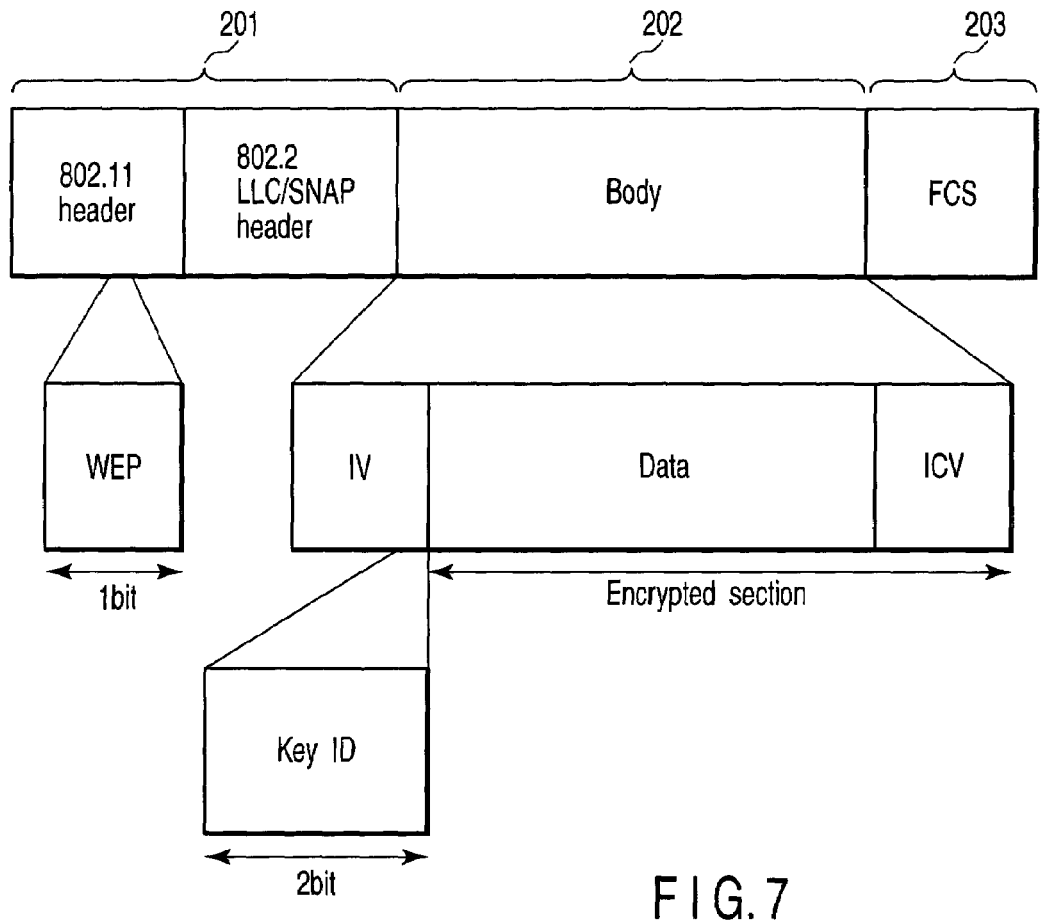
FIG. 7 is a view showing an example of the data structure of a packet exchanged in the wireless LAN system.
FIG. 8 is a table showing an example of a table stored in a cryptographic control unit.

In the table shown in FIG. 8, the identifier of a cryptographic method defined for each level in advance is registered. For example, a higher level is made to correspond to a cryptographic method with a higher cryptographic strength. For level 0, the wireless section between the access point 1 and the client terminal 3 is not encrypted, and no cryptographic method corresponds to level 0.

The authenticating unit 23 reads out from the table shown in FIG. 8 the identifier of a cryptographic method corresponding to a level notified by the authentication server 2. The authenticating unit 23 generates a cryptographic key corresponding to the cryptographic method. The authenticating unit 23 includes a random number generator, generates a random number usable in the cryptographic method by the random number generator, and defines the random number as a cryptographic key. In order to notify the client 3 to be authenticated of the cryptographic method identifier and generated cryptographic key, a packet containing the cryptographic method identifier, cryptographic key, and cryptographic key identifier is output to the internal port w0. As shown in FIG. 6, the level notified by the authentication server 2, the cryptographic method identifier, the cryptographic key, and the cryptographic key identifier (Key ID) are registered in the database unit 24 together with the client identifier (MAC address) of the client terminal 3.

Every time an authentication process with the authentication server ends, the authenticating unit 23 registers in the database unit 24 a client identifier (MAC address) for identifying the client terminal 3 wirelessly connected to the access point 1, a cryptographic key assigned to the client terminal 3, the cryptographic key identifier (Key ID), the cryptographic method identifier, the level of a network communicated using the cryptographic key, and the like, as shown in FIG. 6.

The bridge units br0 to br4 make the five internal ports w0 to w4 of the wireless LAN control unit 21 and the network I/F units eth0 to eth4 correspond to each other, and transfer packets between the wireless LAN control unit 21 and the network I/F units eth0 to eth4. The bridge unit br0 makes the internal port w0 and network I/F unit eth0 correspond to each other. The bridge unit br1 makes the internal port w1 and network I/F unit eth1 correspond to each other. The bridge unit br2 makes the internal port w2 and network I/F unit eth2 correspond to each other. The bridge unit br3 makes the internal port w3 and network I/F unit eth3 correspond to each other. The bridge unit br4 makes the internal port w4 and network I/F unit eth4 correspond to each other.

FIG. 7 shows an example of the data structure of a packet (frame) transmitted from the client terminal 3 to the access point 1. The data structure shown in FIG. 7 is roughly formed by a header part 201, body part 202, and frame check sequence (FCS) part 203. The body part 202 contains an IV (Initialization Vector), data body, and ICV (Integrity Check Value). The IV contains a 2-bit Key ID. The data body and ICV are encrypted using a cryptographic key obtained as a result of authentication. The "802.11 header" of the header part 201 contains 1-bit WEP (Wired Equivalent Privacy), and the WEP expresses whether the data body and ICV are encrypted. The address of a packet-transmitting client, i.e., the MAC address is contained in the 802.11 header. The packet-transmitting client terminal can be uniquely identified from the MAC address and Key ID.

The internal configuration of the wireless LAN control unit 21 will be explained.

The wireless LAN control unit 21 includes a wireless I/F unit 31, a cryptographic control unit 32, and the internal ports w0 to w4.

The wireless I/F unit 31 establishes a wireless communication channel between the access point 1 and the client terminal 3, and exchanges packets via the wireless communication channel.

A packet received by the wireless I/F unit 31 is transferred to the cryptographic control unit 32. By looking up the table as shown in FIG. 6 which is stored in the database unit 24 (using a cryptographic key and cryptographic method stored in the table), the cryptographic control unit 32 decrypts an encrypted packet received from the client terminal 3, and encrypts a packet to be transmitted to the client terminal 3. When a packet transmitted from the client terminal 3 is not encrypted (the WEP bit in FIG. 7 represents "no encryption"), the cryptographic control unit 32 outputs the packet from the internal port w0. For an encrypted packet (the WEP bit in FIG. 7 represents "encryption"), the cryptographic control unit 32 reads out a level, cryptographic key, and cryptographic method identifier from the table shown in FIG. 6 by using, as keys, the MAC address of the transmitting client terminal 3 and the key ID which are contained in the packet. The cryptographic control unit 32 decrypts an encrypted part by using the cryptographic key and the algorithm of a cryptographic method corresponding to the cryptographic method identifier. Further, the cryptographic control unit 32 replaces the "802.11 header" in FIG. 7 with an "802.3 header". The cryptographic control unit 32 outputs the packet to an internal port (one of w1 to w4) corresponding to the readout level.

The cryptographic control unit 32 stores the algorithms of different cryptographic methods. The cryptographic control unit 32 performs encryption/decryption by using, of these cryptographic methods, one corresponding to the cryptographic method identifier.

A packet output from the internal port w0 is input to the packet discriminating unit 22. The packet discriminating unit 22 checks whether the packet input is an authentication packet (packet containing information, message, and the like to be transmitted to the authentication server 2). When the packet is an authentication packet, the packet discriminating unit 22 outputs the packet to the authenticating unit 23. If the packet is not an authentication packet, the packet discriminating unit 22 outputs the packet to the bridge unit br0.

Upon reception of an authentication packet from the client via the packet discriminating unit 22, the authenticating unit 23 generates an authentication packet which is to be transmitted to the authentication server 2 in order to authenticate the client. To transmit the authentication packet to the authentication server 2, the authenticating unit 23 outputs the generated authentication packet to the network I/F unit eth5. When a packet input from the authentication server 2 via the network I/F unit eth5 is an authentication packet for the client terminal 3 (packet which is transmitted from the authentication server 2 and contains information, message, and the like to be received by the client terminal 3), the authenticating unit 23 generates from the packet an authentication packet (packet containing information, message, and the like to be received by the client terminal 3) addressed to the client terminal 3. The authenticating unit 23 outputs the generated packet to the internal port w0 in order to transmit the packet to the client terminal 3.

The bridge unit br0 associates the internal port w0 of the wireless LAN control unit 21 with the network I/F unit eth0. A packet which is input from the internal port w0 to the bridge unit br0 via the packet discriminating unit 22, and a packet which is output from the authenticating unit 23 and input to the bridge unit br0 via the packet discriminating unit 22 are output to the network I/F unit eth0. A packet input from the network I/F unit eth0 to the bridge unit br0 is transferred to the authenticating unit 23 and internal port w0 via the packet discriminating unit 22.

The bridge units br1, br2, br3, and br4 make the internal ports w1, w2, w3, and w4 of the wireless LAN control unit 21 correspond to the network I/F units eth1, eth2, eth3, and eth4, and transfer packets between them.

The network I/F unit eth0 is connected to the network 11 of level 0. The network I/F units eth1, eth2, eth3, and eth4 are respectively connected to the network 12 of level 1, the network 13 of level 2, the network 14 of level 3, and the network 15 of level 4. The network I/F unit eth5 is connected to the authentication network 5.

Figure 9:
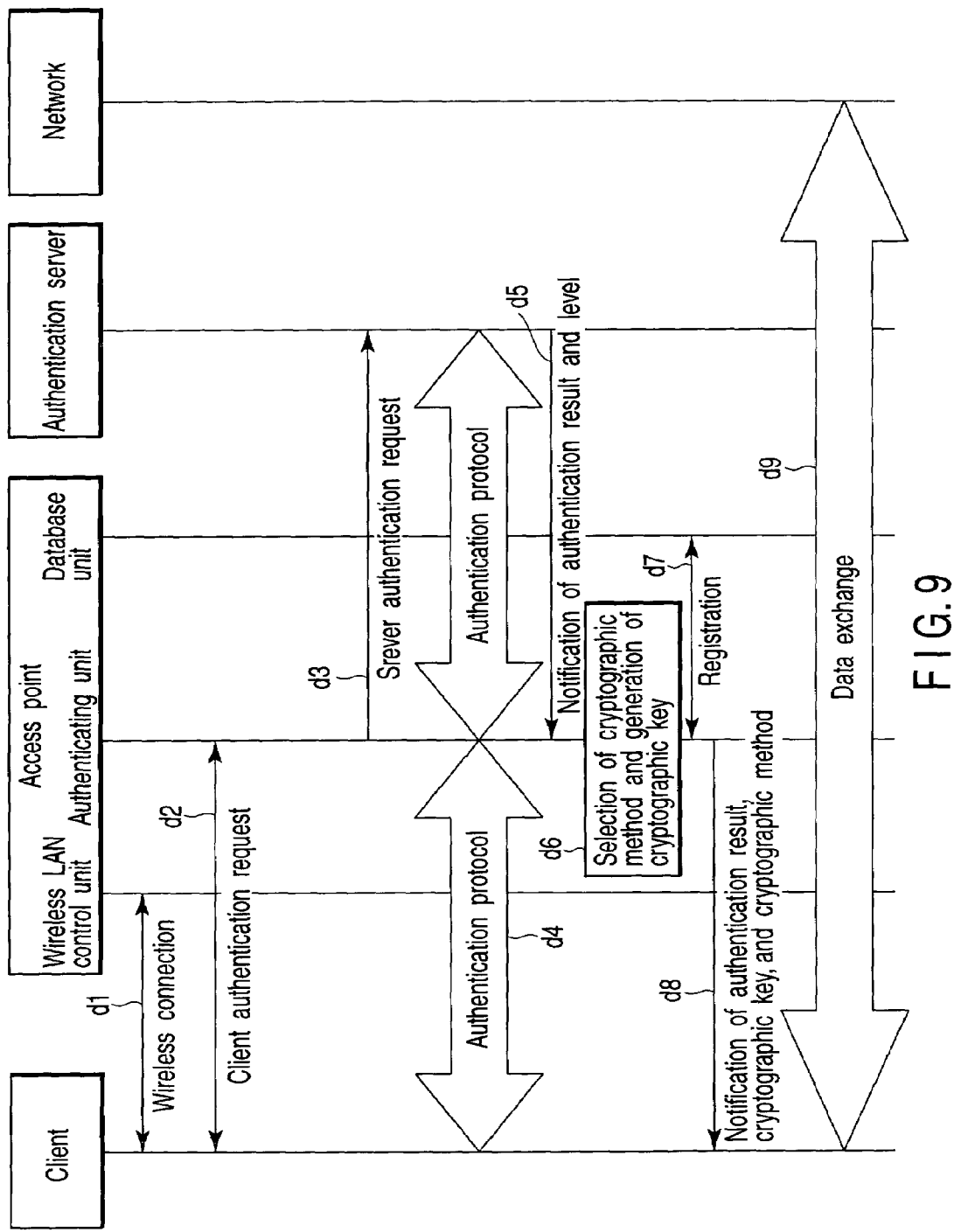
FIG. 9 is a chart for explaining processing operation between a client terminal, the access point, and the authentication server.

Processing operation between the client terminal 3a, the access point 1, and the authentication server 2 will be explained with reference to FIG. 9.

(Step d1) An association is established between the client terminal 3a and the wireless LAN control unit 21 of the access point 1. The client terminal 3a is wirelessly connected to the access point 1.

(Step d2) The client terminal 3a transmits a client authentication request packet to the access point 1. Data of the body part 202 of the packet contains a list of authentication protocols (operable in the client terminal 3a) desired by the client terminal 3a (authentication protocols are described in an order desired by the user). As described above, the header part 201 of the client authentication request packet contains the client identifier (MAC address) "A" of the client terminal 3a. The client authentication request packet is received by the wireless LAN control unit 21 of the access point 1. The client authentication request packet is an authentication packet (not encrypted) transmitted from the client terminal 3a. Thus, the client authentication request packet is output from the internal port w0 and transferred from the packet discriminating unit 22 to the authenticating unit 23.

(Step d3) Upon reception of the client authentication request packet, the authenticating unit 23 generates a server authentication request packet for requesting the authentication server 2 to start the authentication protocol of the client terminal 3a. The authenticating unit 23 transfers the server authentication request packet to the network I/F unit eth5 in order to transmit it to the authentication server 2. The server authentication request packet is transmitted from the network I/F unit eth5 to the authentication server 2 via the authentication network 5. The header part 201 of the server authentication request packet contains the client identifier (MAC address). "A" of the client terminal 3a which requests authentication. Data of the body part 202 contains the list of authentication protocols.

(Step d4) The authentication server 2 that has received the server authentication request packet identifies the client whose client identifier "A" is contained in the server authentication request packet, as an authentication target. The client authentication protocol operates between the client terminal 3a, the authentication server 2, and the access point 1.

In accordance with the authentication protocol, the client terminal 3a transfers to the authentication server 2 via the access point 1 a password "A003" that designates a network (e.g., the network 13 of level 2) from which services desired by the client terminal 3a are to be received.

The authentication protocol process in step d4 will be exemplified. Authentication protocols vary in type, and the sequence changes depending on the type of authentication protocol. For example, an authentication method used in IEEE 802.1x is called an EAP (Extensible Authentication Protocol). The EAP includes several methods such as EAP-TTLS, PEAP, and EAP-TLS. The authentication method between the client terminal 3a and the authentication server 2 may be arbitrary.

For example, an authentication protocol using a hash "EAP-MD5" will be explained. This protocol is executed between the client terminal 3a and the authentication server 2 in accordance with the following sequence.

(Step e1) Prior to the start of authentication, the authentication server 2 decides an authentication protocol for use on the basis of a list (to be referred to as the first list hereinafter) of authentication protocols contained in a server authentication request packet, and a list (to be referred to as the second list hereinafter) of authentication protocols which are permitted by the authentication server 2 for the client terminal 3a. The second list describes authentication protocols corresponding to levels assigned in advance to the client terminal 3a. If the level is higher, the second list contains an authentication protocol with a higher strength.

The authentication server 2 collates the first and second lists, and selects an authentication protocol with a higher strength and a higher priority desired by the user from authentication protocols commonly included in the first and second lists. Assume that the authentication server 2 selects the EAP-MD5 protocol. When no usable authentication protocol exists, the process in step d4 ends, and the authentication server 2 notifies the authenticating unit 23 of the access point 1 that authentication fails.

(Step e2) The authentication server 2 generates a given random number.

(Step e3) In order to transmit an EAP-MD5 challenge message containing the random number to the client terminal 3a, the authentication server 2 transmits an authentication packet containing the message to the authenticating unit 23. The authenticating unit 23 extracts the message from the packet, and generates an authentication packet which contains the message and is addressed to the client terminal 3a. The generated packet is transmitted from the access point 1 to the client terminal 3a.

(Step e4) The client terminal 3a receives the EAP-MD5 challenge message, and recognizes that EAP-MD5 has been selected as an authentication protocol. The client terminal 3a multiplies the random number contained in the EAP-MD5 message and the password "A003" held by the client terminal 3a to calculate a hash value. The client terminal 3a creates a response message containing the hash value.

(Step e5) An authentication packet in which the response message is contained in the body part 202 is transmitted to the access point 1. When the wireless LAN control unit 21 receives the authentication packet, the access point 1 transfers the authentication packet to the authenticating unit 23 via the internal port w0 and packet discriminating unit 22. The authenticating unit 23 extracts the response message from the authentication packet. The authenticating unit 23 generates an authentication packet which contains the message and is addressed to the authentication server 2. The authenticating unit 23 then transmits the authentication packet to the authentication server 2.

(Step e6) The authentication server 2 which has received the authentication packet containing the response message reads out from the table shown in FIG. 8 a plurality of passwords which are registered together with the client identifier "A" received in step d3. The authentication server 2 multiplies the passwords and the random number generated in step e2 to calculate a plurality of hash values.

(Step e7) The hash value contained in the received response message and a plurality of hash values calculated in step e6 are compared. If one of these hash values coincides with the hash value contained in the response message, authentication is recognized to be successful. A level (in this case, "level 2") which is stored in the table shown in FIG. 8 in correspondence with a password corresponding to the coincident hash value is read out.

If none of the calculated hash values coincides with the hash value contained in the response message, authentication is recognized to fail.

(Step d5) If the authentication server 2 authenticates that the authentication target is the client terminal 3a as a result of authentication using the authentication protocol (authentication is successful), the authentication server 2 transmits a packet containing a message representing successful authentication and "level 2" to the authenticating unit 23 of the access point 1. This message contains the client identifier "A" of the client terminal 3a, successful authentication, and "level 2" designated by the password from the client terminal 3a.

Even when authentication fails, the authentication server 2 transmits a packet containing a message representing the authentication failure and "level 0" to the authenticating unit 23.

(Step d6) Upon reception of the packet, the authenticating unit 23 recognizes "level 2" and that the client terminal 3a has been authenticated. The authenticating unit 23 obtains from the table shown in FIG. 8 a cryptographic method identifier (in this case, "method B") which is used to encrypt a wireless communication section with the authenticated client terminal 3a and corresponds to "level 2". Further, the authenticating unit 23 generates a cryptographic key "Ked 1" usable in the cryptographic method and cryptographic key identifier (Key ID) "KID 1" of the cryptographic key "Ked 1".

(Step d7) The cryptographic method "method B", cryptographic key "Ked 1", and cryptographic key identifier (Key ID) "KID 1" are registered in the database unit 24 together with the client identifier "A" of the client terminal 3a.

(Step d8) The authenticating unit 23 generates an authentication packet for notifying the client terminal of successful authentication, the cryptographic method "method B.", the cryptographic key "Ked 1", and the Key ID. The authenticating unit 23 outputs the authentication packet to the internal port w0 in order to transmit it to the client terminal 3a. The authentication packet input to the internal port w0 is transmitted to the client terminal 3a via the authentication server 2.

(Step d9) After the client terminal 3a receives the packet, packets encrypted by the notified cryptographic key are exchanged in communication in the wireless communication section between the client terminal 3a and the access point 1.

An (encrypted) packet that is transmitted from the client terminal 3a and addressed to a system on the network 13 of level 2 is received by the wireless I/F unit 31 of the access point 1. The cryptographic control unit 32 decrypts the encrypted part of the received packet. The cryptographic method and decryption key used at this time are the cryptographic method "method B" and cryptographic key which are registered in the database unit 24 in step d7 in correspondence with the client identifier "A" of the client terminal 3a. That is, the cryptographic control unit 32 acquires the level "level 2", cryptographic key "Ked 1", and cryptographic method identifier "method B" from the database unit 125 by using, as keys, the client identifier "A" of the client terminal 3a and the Key. ID "KID 1" which are contained in the received packet.

The cryptographic control unit 32 decrypts the encrypted part of the received packet by using the cryptographic method and cryptographic key. After decryption, the cryptographic control unit 32 replaces the "802.11 header" in FIG. 7 with an "802.3 header", and outputs the packet to the internal port w2 corresponding to level 2. The packet is transmitted to the system serving as a communication partner on the network 13 of level 2 via the bridge unit br2 and network I/F unit eth2 that correspond to level 2.

On the other hand, a packet that is transmitted to the client terminal 3a from the system serving as a communication partner of the client terminal 3a on the network 13 of level 2 reaches the wireless LAN control unit 21 via the network I/F unit eth2 and bridge unit br2 of the access point 1. In this case, the packet is input from the internal port w2 to the wireless LAN control unit 21.

Based on which of the five internal ports w0 to w4 has transmitted the packet, the cryptographic control unit 32 recognizes a level corresponding to the client terminal serving as a packet transmission destination. For example, when the packet is input from the internal port w2, the cryptographic control unit 32 recognizes that the level of the client terminal serving as a packet transmission destination is "level 2". The cryptographic control unit 32 obtains the MAC address "A" as the client identifier of the client terminal 3a from a destination address contained in the header part 201 of the packet input from the internal port w2. By using the obtained client identifier "A" and recognized level "level 2" as keys, the cryptographic control unit 32 acquires from the database unit 24 the cryptographic key "Ked 1" and cryptographic method identifier "method B" which are stored in correspondence with "A" and "level 2".

The cryptographic control unit 32 encrypts a target part of the packet input from the internal port w2 by using the cryptographic key "Ked 1" and cryptographic method "method B". The encrypted packet is transmitted from the wireless I/F unit 31 to the client terminal 3a.

The packet transfer method of the access point 1 will be described in detail.

Figure 10:
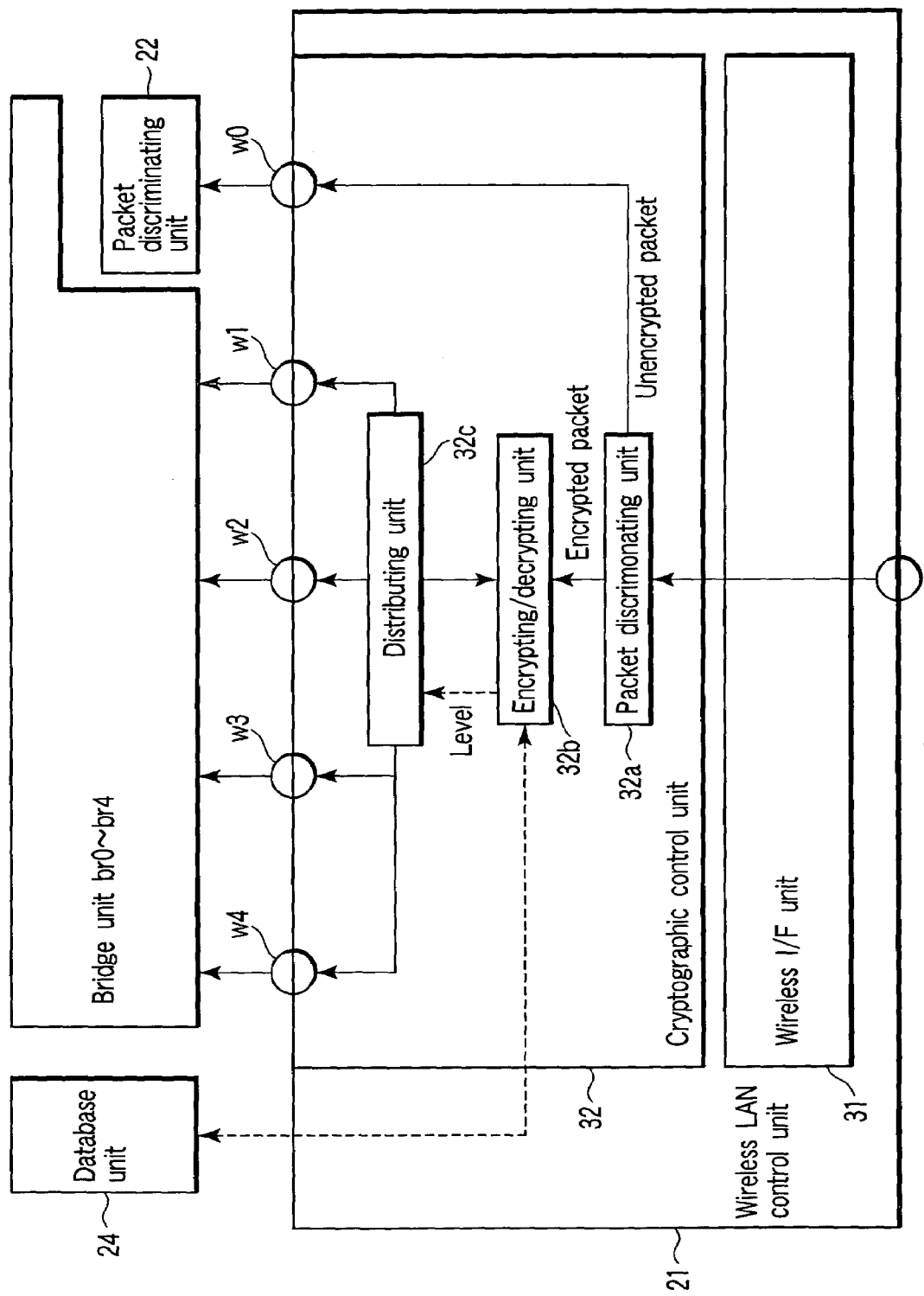
FIG. 10 is a block diagram showing the detailed configuration of a wireless LAN control unit and a data flow in the wireless LAN control unit upon receiving a packet transmitted from the client terminal.
Figure 11:
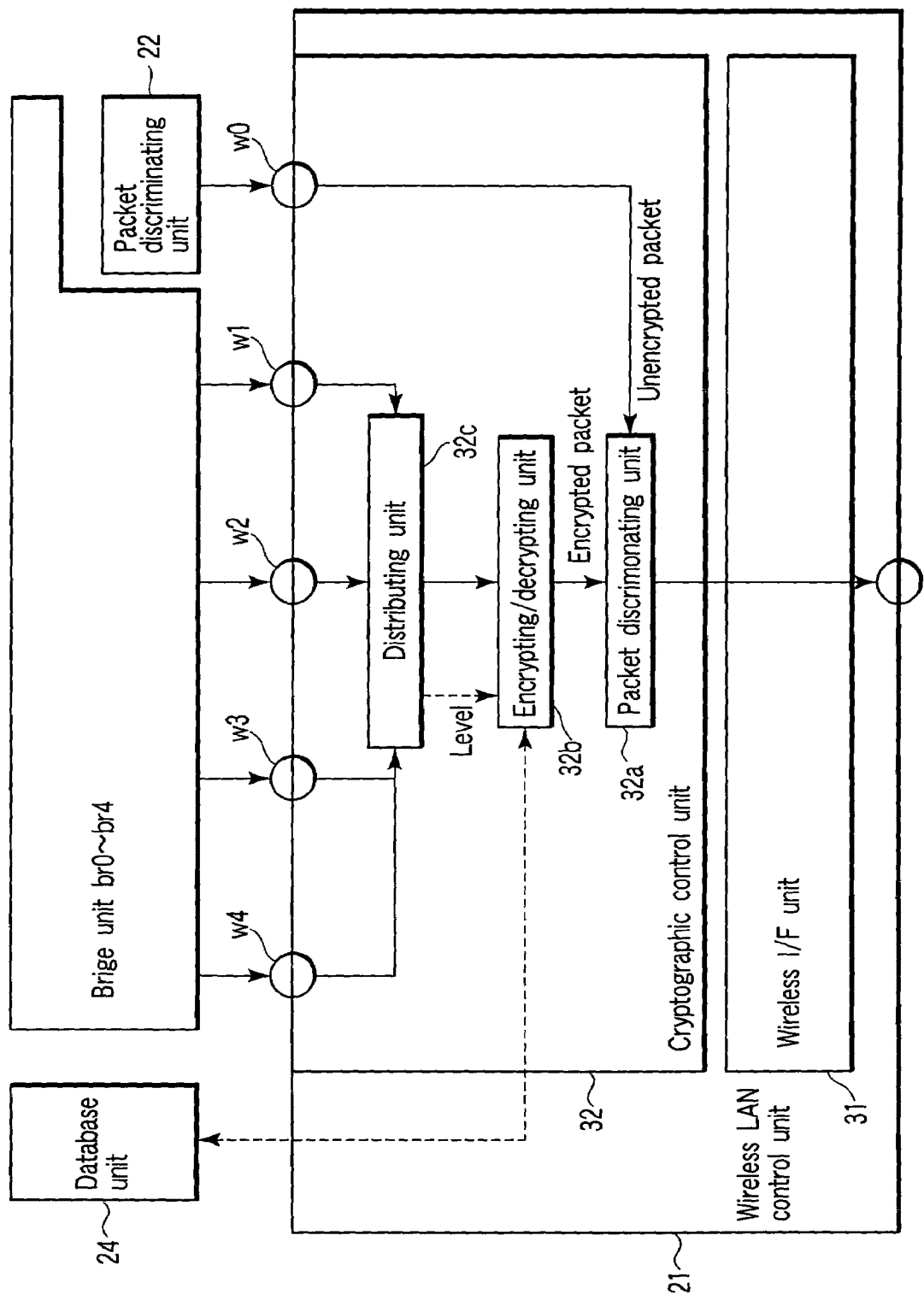
FIG. 11 is a block diagram showing the detailed configuration of the wireless LAN control unit and a data flow in the wireless LAN control unit in transmitting a packet to the client terminal.

FIG. 10 shows the detailed configuration of the wireless LAN control unit 21 of the access point 1, and a data flow in the wireless LAN control unit 21 upon receiving a packet transmitted from the client terminal 3. FIG. 11 shows the detailed configuration of the wireless LAN control unit 21 of the access point 1, and a data flow in the wireless LAN control unit 21 in transmitting a packet to the client terminal 3.

As described above, the wireless LAN control unit 21 includes the wireless I/F unit 31, cryptographic control unit 32, and internal ports w0 to w4.

As shown in FIGS. 10 and 11, the cryptographic control unit 32 includes a packet discriminating unit 32a, encrypting/decrypting unit 32b, and distributing unit 32c.

The packet discriminating unit 32a checks whether a received packet has been encrypted. Whether a packet has been encrypted can be identified by referring to a WEP bit contained in the 802.11 header of the wireless LAN frame in FIG. 7. The encrypting/decrypting unit 32b encrypts a packet in transmission by wireless communication, and decrypts a packet upon reception by wireless communication. The identifier Key ID of a cryptographic key used for encryption/decryption is contained in a packet transmitted from the client terminal 3 (see FIG. 7).

A packet received by the wireless I/F unit 31 of the wireless LAN control unit 21 is transferred to one of the internal ports w0 to w4 via the cryptographic control unit 32. A packet transferred to the internal port w0 reaches the packet discriminating unit 22, whereas packets transferred to the remaining internal ports reach the bridge units.

The encrypting/decrypting unit 32b of the cryptographic control unit 32 is connected to the database unit 24. Based on the client identifier (MAC address) and Key ID which are contained in a packet transmitted from the packet-transmitting client terminal 3, the encrypting/decrypting unit 32b accesses the database unit 24 to acquire a cryptographic key and cryptographic method identifier used by the client terminal 3.

Figure 12:
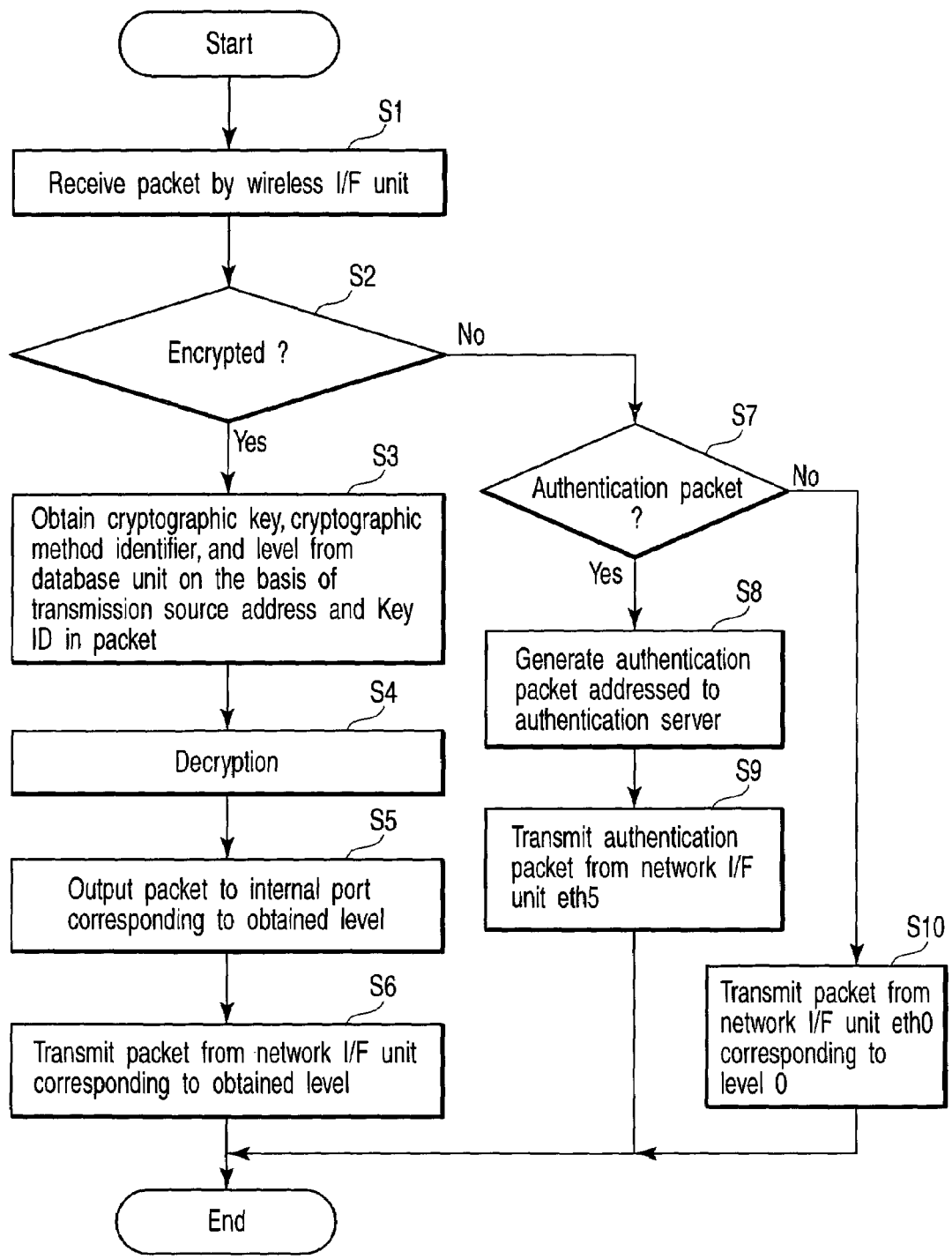
FIG. 12 is a flowchart for explaining processing operation when a packet is received at the access point in wireless communication between the client terminal and the access point.

Processing operation when the access point 1 receives a packet in wireless communication between the client terminal 3 and the access point 1 will be explained with reference to the flowchart shown in FIG. 12.

A packet transmitted by the client terminal 3 is received the wireless I/F unit 31. The packet received by the wireless I/F unit 31 is transferred to the packet discriminating unit 32a of the authentication server 2 (step S1). The packet discriminating unit 32a checks whether the received packet has been encrypted. An encrypted packet is transferred to the encrypting/decrypting unit 32b, whereas an unencrypted packet is transferred to the packet discriminating unit 22 via the internal port w0 without encryption (step S2).

On the basis of a transmission source address (MAC address) and Key ID which are contained in the received packet, the encrypting/decrypting unit 32b acquires from the database unit 24 a level and a cryptographic key and cryptographic method identifier which are used for encryption (step S3). The encrypting/decrypting unit 32b decrypts the encrypted part of the received packet by using the acquired cryptographic key (step S4), and transfers the resultant packet to the distributing unit 32c. At the same time, the encrypting/decrypting unit 32b notifies the distributing unit 32c of the acquired level.

The distributing unit 32c replaces the "802.11 header" of the received packet with an "802.3 header". The distributing unit 32c outputs the packet to an internal port (one of w1 to w4) corresponding to the notified level (step S5).

The packet output from the internal port is sequentially transferred to a bridge unit and network I/F unit of the same level as that of the internal port, and output to a network of this level (step S6).

The packet discriminating unit 22 receives a packet output from the internal port w0 of the wireless LAN control unit 21. If the packet discriminating unit 22 recognizes that the packet is the authentication packet of the client terminal 3, the unit 22 transfers the packet to the authenticating unit 23 (step S7).

The authenticating unit 23 extracts information and a message to be sent to the authentication server 2 from the received packet, and newly generates an authentication packet which contains the extracted information, message, and the like and is addressed to the authentication server 2 (step S8). The newly generated packet is transmitted from the network I/F unit eth5 to the authentication server 2 (step S9).

If the packet discriminating unit 22 recognizes that the packet received from the internal port w0 is not an authentication packet (NO in step S7), the packet is one to be output to the network 11 of level 0. Thus, the process advances to step S10 to transfer the packet to the bridge unit br0.

In step S10, the packet received by the bridge unit br0 is transmitted from the network I/F unit eth0 to a system on the network 11 of level 0.

Figure 13:
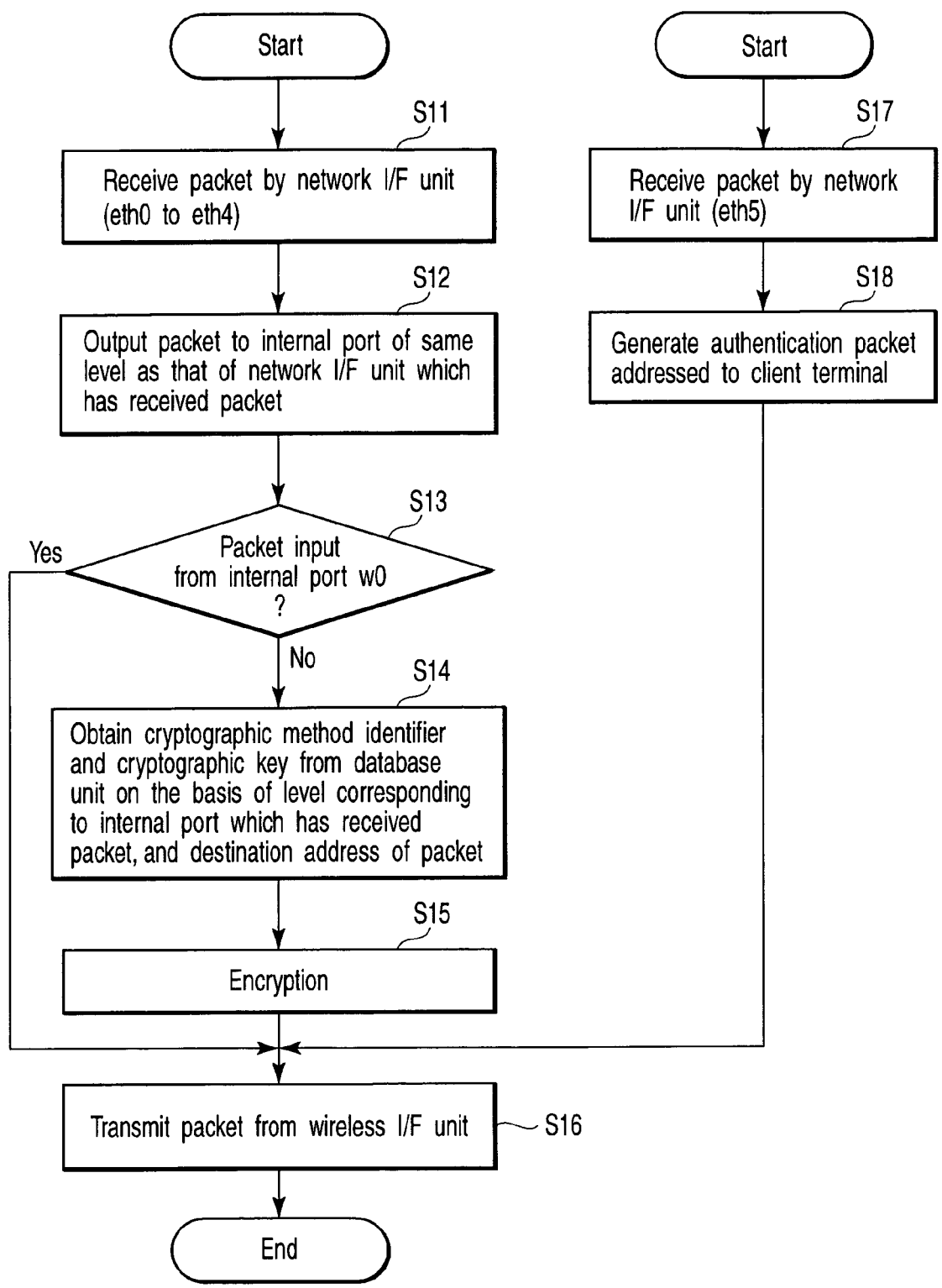
FIG. 13 is a flowchart for explaining processing operation when a packet is transmitted at the access point in wireless communication between the client terminal and the access point.

Processing operation when the access point 1 transmits a packet in wireless communication between the client terminal 3 and the access point 1 will be explained with reference to FIG. 11 and the flowchart shown in FIG. 13.

Processing operation when a packet is transmitted to, e.g., the client terminal 3a from a system on the network 11 of level 0 will be described first.

A packet from the system on the network 11 of level 0 is received by the network I/F unit eth0 (step S11). The packet received by the network I/F unit eth0 is transferred to the internal port w0 via the bridge unit br0 and packet discriminating unit 22 (step S12).

The packet input to the internal port w0 (packet to be transmitted to the client terminal) passes through the packet discriminating unit 32a of the cryptographic control unit 32 (because the packet need not be encrypted). The packet further passes through the wireless I/F unit 31, and is transmitted to the unauthenticated client terminal 3a without any encryption (steps S13 and S16).

Next, processing operation when a packet is transmitted to, e.g., the client terminal 3a from a system on the network 13 of level 2 will be described. In this case, level 2 will be exemplified, but the following description also applies to levels 1, 3, and 4.

A packet from the system on the network 13 of level 2 is received by the network I/F unit eth2 (step S11). The packet received by the network I/F unit eth2 is transferred to the bridge unit br2. The bridge unit br2 transfers the packet to the internal port w2 (step S12).

The transmission packet that is input from the internal port w2 to the wireless LAN control unit 21 and addressed to the client terminal 3a is input to the distributing unit 32c of the cryptographic control unit 32. Since the packet is input from the internal port w2, the distributing unit 32c recognizes that a level corresponding to the packet is "level 2". The distributing unit 32c replaces the "802.3 header" of the received packet with an "802.11 header". The distributing unit 32c transfers the packet to the encrypting/decrypting unit 32b. At this time, the distributing unit 32c outputs a level corresponding to the packet, i.e., "level 2" to the encrypting/decrypting unit 32b.

The encrypting/decrypting unit 32b acquires a cryptographic method identifier and cryptographic key from the database unit 24 on the basis of an address (MAC address) "A" contained in the packet received from the distributing unit 32c and the level "level 2" notified by the distributing unit 32c (step S14). In this case, the encrypting/decrypting unit 32b acquires a cryptographic method identifier "method B" and cryptographic key "Ked 1". The encrypting/decrypting unit 32b encrypts the packet to be transmitted to the client terminal 3a by using the acquired cryptographic method and cryptographic key, and transfers the encrypted packet to the packet discriminating unit 32a (step S15).

The packet discriminating unit 32a transmits the encrypted packet to the client terminal 3a via the wireless I/F unit 31 (step S16).

Processing operation of the access point 1 when the access point 1 receives an authentication packet addressed to, e.g., the client terminal 3a from the authentication server 2 via the network 13 will be explained with reference to the flowchart shown in FIG. 13.

An authentication packet transmitted from the authentication server 2 is received by the network I/F unit eth5 (step S17). The received packet is transferred to the authenticating unit 23. The authenticating unit 23 extracts information and a message to be received by the client terminal 3a from the received packet. The authenticating unit 23 newly generates an authentication packet that contains the extracted information, message, and the like and is addressed to the client terminal 3a (step S18). The newly generated packet is input to the wireless LAN control unit 21 via the internal port w0, passes through the packet discriminating unit 32a, and is transmitted to the client terminal 3a via the wireless I/F unit 31 (without encryption) (step S16).

As described above, according to the embodiment, the authentication network 5 and different types of networks 11 to 15 with different security levels are connected to the access point 1. Whether to authenticate the client terminal 3 which is wirelessly connected to the access point 1, and a level corresponding to the client terminal 3 are inquired of the authentication server 2 via the authentication network 5. The authentication server 2 selects a level corresponding to the client terminal 3 on the basis of the authentication result of the client terminal 3, a level assigned in advance to the client terminal 3, and a request (password) from the client terminal 3.

When the selected level is a level other than "level 0", the access point 1 notifies the client terminal 3 of a cryptographic method and cryptographic key corresponding to the level. The client terminal 3 transmits data encrypted using the cryptographic method and cryptographic key to the access point 1 together with the client identifier and cryptographic key identifier (Key ID). The access point 1 recognizes the level from the client identifier and cryptographic key identifier. The received encrypted data is decrypted using the cryptographic method and cryptographic key. The data passes a bridge unit corresponding to the level from an internal port corresponding to the level out of the internal ports w0 to w4. The data is then transmitted from a network I/F unit corresponding to the level to a network corresponding to the level.

When the selected level is "level 0", the wireless section need not be encrypted, and the access point 1 does not notify the client terminal 3 of a cryptographic method and cryptographic key. When the access point 1 receives unencrypted data from the client terminal 3, it recognizes (from the WEP bit value) that the received data has not been encrypted and corresponds to level 0. The received data passes the bridge unit br0 from the internal port w0, and is transmitted from the network I/F unit eth0 to the network 11 of level 0.

According to the embodiment, the authentication server 2 selects one of level 0 and a level corresponding to a password on the basis of a client identifier and password which are sent from the client terminal 3, an accessible network level which is registered in the table shown in FIG. 5 and assigned in advance to the client 3, and the authentication result of the client terminal 3. An optimal network level (level 0 or a level corresponding to a password) can be selected in consideration of the level assigned in advance to the client terminal 3, the authenticity of the client terminal 3, and a level corresponding to a password sent from the client terminal 3. Hence, the client terminal 3 can easily, flexibly access one of a plurality of networks while securities assigned in advance to these networks connected to the access point 1 are maintained.

The access point 1 processes data received from the client terminal 3 as data from an internal port (w0 to w4) that changes depending on the authentication result and level of the client terminal 3. The network I/F units eth0 to eth4 are connected to different networks in accordance with the level. Different services can be provided in accordance with the authentication result and level of the client terminal.

The authentication server 2 is connected to the authentication network 5 different from the networks 11 to 15 accessible by the client terminal 3, improving the security of the authentication system. This implements a wireless LAN system which provides services of different levels to a client in accordance with the authentication result (successful or failed authentication).

In FIG. 4, the access point 1 is connected to the networks 11 to 15 of five levels. The access point 1 includes the five internal ports w0 to w4, five bridge units br0 to br4, and five network I/F units eth0 to eth4 in correspondence with the five levels (level 0 to level 4) of these networks. However, the number of levels is not limited to five and may be arbitrary. For example, the access point 1 is connected to two networks of levels 0 and 1, as shown in FIG. 14. Encryption is done in a wireless section in access to the network of level 1, and is not done in a wireless section in access to the network of level 0. In this case, the access point 1 includes two internal ports w0 and w1, two bridge units br0 and br1, and two network I/F units eth0 and eth1 in accordance with the two network levels (levels 0 and 1).

Also the configuration shown in FIG. 14 is the same as that shown in FIG. 4, and can obtain the same effects as those in the configuration shown in FIG. 4.

In FIG. 3, the authentication server 2 is connected to the authentication server 2 via the authentication network 5. Alternatively, the authentication server 2 and access point 1 may be integrated.

What is claimed is:

1. A communication apparatus which is wirelessly connected to a first terminal and is connected to a plurality of networks corresponding to different security levels and including a first network of a first security level which is a lowest security level of the security levels and a second network of a second security level of the security levels, the communication apparatus comprising:

a wireless LAN control unit configured to connect to the first terminal and communicate with the first terminal; and an authentication unit configured to (a) authenticate the first terminal, to (b) select one of the first security level and the second security level based on an authentication result of the first terminal, a first terminal identifier and a first password corresponding to one of the networks, the first terminal identifier and the first password being transmitted from the first terminal and received by the wireless LAN control unit, and to (c) generate, when the second security level is selected, a cryptographic key used in a first cryptographic algorithm corresponding to the second security level, wherein the wireless LAN control unit (a) transmits when the second security level is selected, the cryptographic key and an identifier of the first cryptographic algorithm to the first terminal, (b) transfers, when the second security level is selected, a first data item to the second network and a second data item to the first terminal, the first data item obtained by being encrypted by the first terminal using the first cryptographic algorithm and the cryptographic key, and received from the first terminal, and the second data item addressed to the first terminal and received from the second network; and (c) transfers, when the first security level is selected, a third data item to the first network and a fourth data item to the first terminal, the third data item received from the first terminal, and the fourth data item addressed to the first terminal and received from the first network.

2. The communication apparatus according to claim 1, wherein the wireless LAN control unit comprises:

a memory to store the first cryptographic algorithm corresponding to the second security level, and the identifier of the first cryptographic algorithm;

a decrypting unit configured to decrypt the first data item by using the first cryptographic algorithm and the cryptographic key;

a transfer unit configured to transfer the first data item decrypted to the second network;

an encrypting unit configured to encrypt the second data item by using the first cryptographic algorithm and the cryptographic key; and a transfer unit configured to transfer the second data item encrypted to the first terminal.

3. The communication apparatus according to claim 1, wherein the authentication unit comprises:

a memory to store a plurality of registration data items including a first registration data item having the first terminal identifier, the first registration data item including the second security level and a password necessary to access the second network, wherein the authentication unit selects the second security level included in the first registration data item, when the authentication result is successful and the first password corresponds to the password included in the first registration data item.

4. The communication apparatus according to claim 1, wherein the memory in the wireless LAN control unit stores a plurality of cryptographic algorithms including the first cryptographic algorithm, the cryptographic algorithms having different cryptographic strengths in correspondence with security levels.

5. The communication apparatus according to claim 3, wherein the registration data items include a group of registration data items each having the first terminal identifier, each of the registration data items of the group includes an independent security level and an independent password, and the first registration data item belongs to the group.

6. The communication apparatus according to claim 1, wherein the authentication unit selects the first security level, when the authentication result of the first terminal is not success.

7. The communication apparatus according to claim 5, wherein the authentication unit selects the first security level, when the registration data items included in the group fail to include the password corresponding to the first password.

8. A communicating method for communicating between a first terminal and one of a plurality of networks corresponding to different security levels and including a first network of a first security level which is a lowest security level of the security levels and a second network of a second security level of the security levels, the communicating method comprising:

(a) storing a first cryptographic algorithm corresponding to the second security level and an identifier of the first cryptographic algorithm in a memory device;

(b) authenticating the first terminal to obtain an authentication result of the first terminal;

(c) selecting one of the first security level and the second security level based on the authentication result of the first terminal, a first terminal identifier, and a first password corresponding to one of the networks, the first terminal identifier and the first password being transmitted by the first terminal;

(d) generating, when the second security level is selected, a cryptographic key used in the first cryptographic algorithm;

(e) transmitting, when the second security level is selected, the cryptographic key and the identifier of the first cryptographic algorithm to the first terminal;

(f) transferring, when the second security level is selected, a first data item to the second network and a second data item to the first terminal, the first data item obtained by being encrypted by the first terminal using the first cryptographic algorithm and the cryptographic key, and is transmitted by the first terminal, and the second data item addressed to the first terminal and transmitted from the second network; and (g) transferring, when the first security level is selected, a third data item to the first network and a fourth data item to the first terminal, the third data item transmitted by the first terminal, and the fourth data item addressed to the first terminal and transmitted from the first network.

9. The communicating method according to claim 8, wherein the transferring (f) includes:

decrypting the first data item by using the first cryptographic algorithm and the cryptographic key;

transferring the first data item decrypted to the second network;

encrypting the second data item by using the first cryptographic algorithm and the cryptographic key; and transferring the second data item encrypted to the first terminal.

10. The communicating method according to claim 8, wherein the selecting (c) includes:

storing, in a second memory device, a plurality of registration data items including a first registration data item having the first terminal identifier, the first registration data item including the second security level and a password necessary to access the second network; and selecting the second security level included in the first registration data item, when the authentication result of the first terminal is successful and the first password corresponds to the password included in the first registration data item.

11. The communicating method according to claim 10, wherein the registration data items include a group of registration data items each having the first terminal identifier, each of the registration data items belonging to the group includes an independent security level and an independent password, and the first registration data item belongs to the group.

12. The communicating method according to claim 8, wherein the selecting (c) selects the first security level, when the authentication result of the first terminal is failed.

13. The communicating method according to claim 11, wherein the selecting (c) selects the first security level, when the registration data items included in the group fail to include the password corresponding to the first password.

14. The communicating method according to claim 8, wherein the authenticating (b) authenticates the first terminal via a communication apparatus and a third network whose security level is higher than the security levels; and the selecting (c) selects, based on the authentication result of the first terminal, the first terminal identifier and the first password, the first terminal identifier and the first password being transferred via the communication apparatus and the third network.

* * * * *

UNITED STATES PATENT AND TRADEMARK OFFICE
CERTIFICATE OF CORRECTION

| | | |
|---|---|---|
| PATENT NO. | : 7,443,983 B2 | Page 1 of 1 |
| APPLICATION NO. | : 10/973472 | |
| DATED | : October 28, 2008 | |
| INVENTOR(S) | : Tanizawa et al. | |

It is certified that error appears in the above-identified patent and that said Letters Patent is hereby corrected as shown below:

On the title page, the Terminal Disclaimer information has been omitted. Item (45) and the Notice information should read as follows:

On the Title Page, Items

-- (45) Date of Patent: Oct. 28, 2008

(*) Notice: Subject to any disclaimer, the term of this patent is extended or adjusted under 35 U.S.C. 154(b) by 525 days.

This patent is subject to a terminal disclaimer. --

Signed and Sealed this

Sixth Day of January, 2009

JON W. DUDAS
*Director of the United States Patent and Trademark Office*